(12) United States Patent
Booth et al.

(10) Patent No.: US 6,916,271 B2
(45) Date of Patent: Jul. 12, 2005

(54) METHOD AND APPARATUS FOR CALIBRATING A MARINE TROLLING VALVE

(75) Inventors: Timothy A. Booth, Groveland, IL (US); David L. Zwetz, Morton, IL (US); Gregory S. Hasler, Pekin, IL (US)

(73) Assignee: Caterpillar Inc, Peoria, IL (US)

( * ) Notice: Subject to any disclaimer, the term of this patent is extended or adjusted under 35 U.S.C. 154(b) by 26 days.

(21) Appl. No.: 10/635,998

(22) Filed: Aug. 7, 2003

(65) Prior Publication Data

US 2005/0032605 A1 Feb. 10, 2005

(51) Int. Cl.⁷ .............................................. B60K 41/02
(52) U.S. Cl. ...................................... 477/181; 477/166
(58) Field of Search ............................... 477/166, 181; 701/67, 68; 192/103 F, 109 F

(56) References Cited

U.S. PATENT DOCUMENTS

| | | | | |
|---|---|---|---|---|
| 5,029,678 A | * | 7/1991 | Koshizawa | 192/76 |
| 5,224,577 A | * | 7/1993 | Falck et al. | 74/336 R |
| 5,393,274 A | * | 2/1995 | Smedley | 477/74 |
| 5,624,350 A | * | 4/1997 | Bates | 477/78 |
| 6,494,810 B1 | * | 12/2002 | Mack et al. | 477/174 |
| 6,711,486 B1 | * | 3/2004 | Karlsson et al. | 701/67 |

* cited by examiner

*Primary Examiner*—Dirk Wright
(74) *Attorney, Agent, or Firm*—Steven Lundquist

(57) ABSTRACT

A method and apparatus for controlling an amount of engagement of a clutch with a transmission. The method and apparatus includes selecting an engagement parameter, determining a desired operating parameter associated with the engagement parameter, and calibrating a control system to generate an engagement control signal to achieve the engagement parameter based on the desired operating parameter.

15 Claims, 2 Drawing Sheets

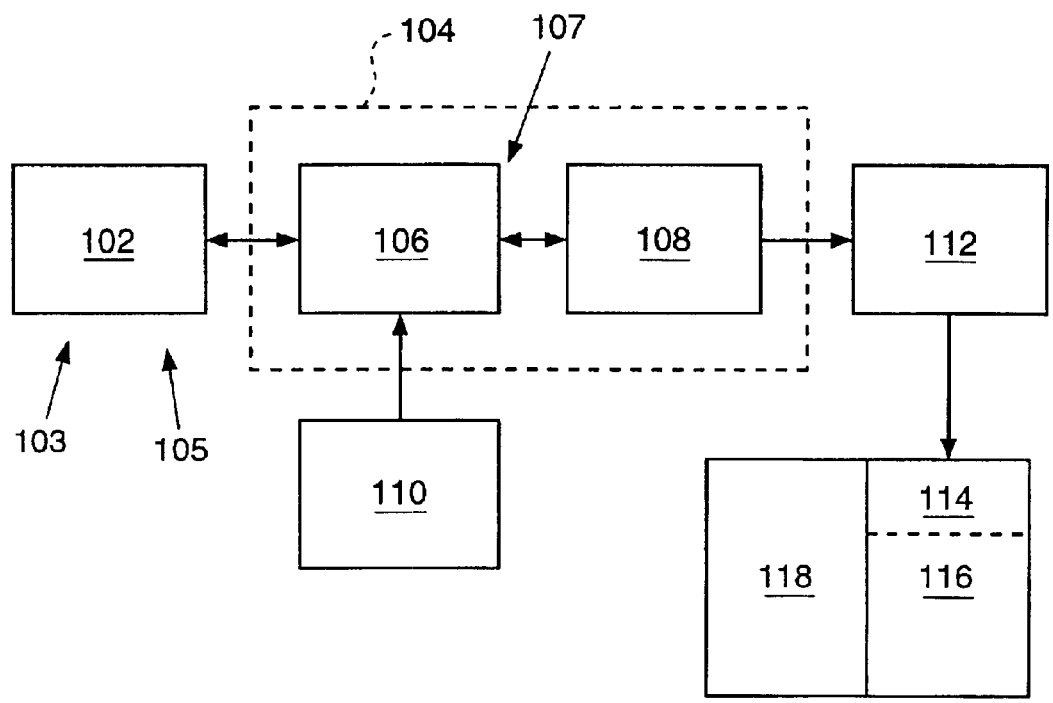

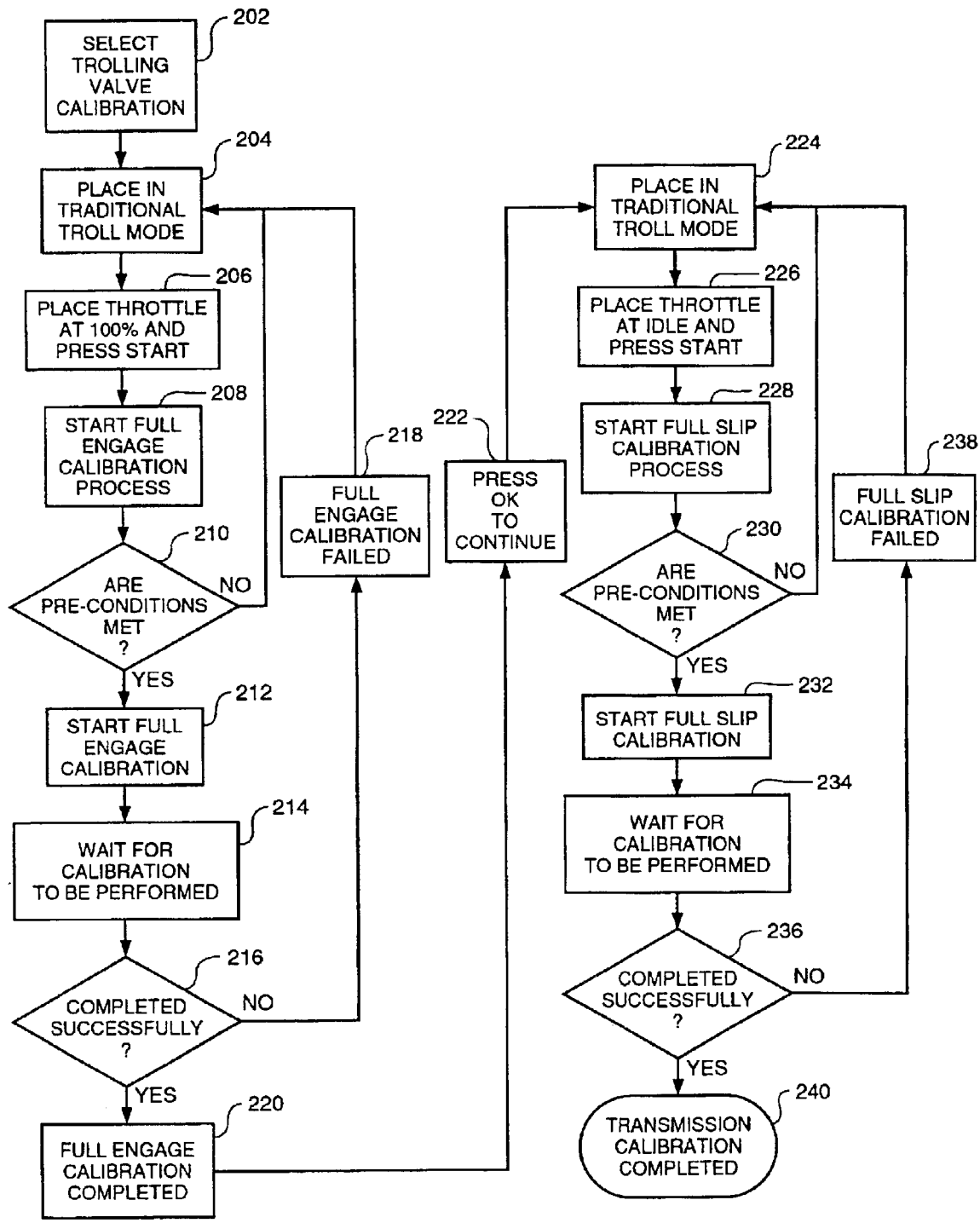

METHOD AND APPARATUS FOR CALIBRATING A MARINE TROLLING VALVE

TECHNICAL FIELD

This invention relates generally to a method and apparatus for calibrating a trolling valve for a marine engine and, more particularly, to a method and apparatus for calibrating a trolling valve for zero slip and full slip conditions.

BACKGROUND

Marine engines are often used in an idle condition for trolling operations, i.e., to slowly propel a marine vessel for a specific purpose such as bait fishing and the like. Quite often, however, the vessel speed at engine idle exceeds a desired speed. Thus, a typical solution is to engage a degree of slip in the engagement of a clutch with a transmission. For example, a hydraulic clutch may be controlled to engage a transmission in a range from full engagement, i.e., zero slip, to no engagement, i.e., full slip.

Typical control systems are initially set with fixed values of a control parameter such as current or voltage to control the amount of slip to a marine transmission during trolling operations. These parameters are defined during initial installation and cannot be changed. However, engine and transmission specifications vary from one machine to the next, so there is no guarantee that the fixed control values are optimal. Furthermore, the engine and transmission operating parameters change over time due to components wearing and changing. As a result, the control system may not be engaging an optimal or even a desired level of slip during the trolling operation.

The present invention is directed to overcoming one or more of the problems as set forth above.

SUMMARY OF THE INVENTION

In one aspect of the present invention a method for controlling an amount of engagement of a clutch with a transmission is disclosed. The method includes the steps of selecting an engagement parameter, determining a desired operating parameter associated with the engagement parameter, and calibrating a control system to generate an engagement control signal to achieve the engagement parameter based on the desired operating parameter.

In another aspect of the present invention a computer-based method for calibrating a control signal for engagement of a clutch with a transmission is disclosed. The method includes the steps of receiving a command signal to initiate a calibration procedure, checking a status of at least one operating condition, proceeding with the calibration procedure in response to determining that the status of the at least one operating condition has been met, and adjusting the control signal to achieve a desired amount of engagement of the clutch with the transmission.

In still another aspect of the present invention a computer-based method for calibrating a control signal for a trolling valve operable to control an amount of engagement of a clutch with a transmission is disclosed. The method includes the steps of receiving a command signal to initiate a command procedure, checking a status of at least one operating condition, determining that the status of the at least one operating condition has been met, selecting one of a full engage and a full slip amount of engagement, determining a value of the control signal needed to achieve the selected amount of engagement, selecting an other of the full engage and full slip amount of engagement, determining a value of the control signal needed to achieve the other selected amount of engagement, and delivering a notification signal that calibration is complete.

In yet another aspect of the present invention an apparatus for calibrating a control signal for engagement of a clutch with a transmission is disclosed. The apparatus includes an operator interface, a control system in communications with the operator interface and configured to calibrate the control signal to correspond to an amount of engagement of the clutch with the transmission, and a trolling valve operable to receive the calibrated control signal from the control system and responsively control the amount of engagement of the clutch with the transmission.

BRIEF DESCRIPTION OF THE DRAWINGS

FIG. 1 is a block diagram illustrating an exemplary embodiment of the present invention; and FIG. 2 is a flow diagram illustrating an exemplary method of the present invention.

DETAILED DESCRIPTION

Referring to the drawings, a method and apparatus 100 for controlling an amount of engagement of a clutch 114 with a transmission 116 is shown. More particularly, the drawings depict a method and apparatus 100 for calibrating a control signal for engagement of a clutch 114 with a transmission 116. The method and apparatus 100 may be computer-based, i.e., the control and calibration processes are computer controlled.

The present invention finds particular application in the marine industry, in which it is often desired to engage a clutch with a transmission such that a certain controlled amount of slip is present. For example, trolling operations often require transmission speeds lower than engine idle speeds, and controlled slip helps achieve the desired transmission speeds. However, the present invention may also be used in other applications, such as earthworking, construction, manufacturing, and the like, in situations in which controlled slip of a transmission is desired.

Referring to FIG. 1, a block diagram illustrating a preferred embodiment of the present invention is shown.

An operator interface 102 provides a tool in which an operator, e.g., an installer or a service technician, may directly connect to onboard computers/controllers. The operator interface 102, as is well known in the art, may include information input means such as a keyboard (not shown), and information output means such as a display (not shown). The operator interface 102 of the present invention may also include means 103 for selecting an engagement parameter, described in more detail below. The operator interface 102 may also include means 105 for determining a desired operating parameter associated with the engagement parameter, also described in more detail below.

The operator interface 102 is preferably suited to interconnect with a control system 104. The control system 104 may be located onboard a vessel, such as a marine vessel (not shown), and is typically used to monitor and control various functions and parameters associated with an engine 118, clutch 114 and transmission 116, which in turn provide prime motive power to the vessel. The control system is preferably computer-based and may perform many tasks in addition to those pertinent to the present invention.

In an exemplary embodiment, the control system 104 may include a calibration module 106, which in turn may include means 107 for calibrating the control system 104 to generate an engagement control signal to achieve the engagement parameter based on the desired operating parameter, described more fully below. The control system 104 may also include a control signal module 108 to generate a calibrated control signal and deliver the signal to a desired location, as described below.

At least one sensor 110 is electrically connected to the control system 104. The sensor 110 may be suited for determining a pressure of the clutch 114 applied to the transmission 116, for example a pressure sensor. As an example, the clutch 114 may be a hydraulic clutch and the sensor 110 may be configured to sense an amount of hydraulic pressure applied by the clutch 114 to the transmission 116.

Alternatively, the sensor 110 may be configured to sense some other desired parameter, such as an output speed of the transmission 116.

It is noted that the sensor 110 may directly sense the desired parameter, e.g., pressure, speed, and the like, or may determine the desired parameter from other sensed signals. For example, the sensor 110 may receive signals indicative of various operating parameters and responsively determine the parameter of interest.

A trolling valve 112 may be configured to receive control signals from the control system 104 and responsively control an amount of hydraulic fluid to the clutch 114, thus controlling the amount of engagement of the clutch 114 with the transmission 116. Although the valve 112 is referred to as a trolling valve 112, thus implying a specific application on marine vessels for trolling operations, the valve 112 may be used in any of a variety of other applications for the purpose of controlling an amount of hydraulic fluid to a clutch. Thus, further reference to the trolling valve 112 is meant to encompass hydraulic valves for applications other than marine as well.

INDUSTRIAL APPLICABILITY

An exemplary application of the present invention may best be described with reference to the flow diagram of FIG. 2.

In a first block 202, an operator selects a trolling valve calibration procedure, preferably programmed into each of the operator interface 102 and the control system 104.

In a second block 204, the operator then places control of the engine 118 in a traditional troll mode. In a marine application, there are typically two trolling modes. First, in a traditional troll mode, the engine speed is held constant and the amount of clutch-to-transmission slip changes with varying throttle positions. Second, in an advanced troll mode, both engine speed and slip change with varying throttle positions. For purposes of the calibration procedure, it is desired that the engine speed remain constant and thus the traditional troll mode is required.

In a third block 206, the operator places the throttle (not shown) at 100% and starts the calibration procedure. Placing the throttle at 100% is in effect selecting a full engagement parameter, i.e., zero slip.

In a fourth block 208, the control system 104, in cooperation with the operator interface 102, begins the full engage calibration process. Preliminary to calibration however, the control system 104, in a fifth block 210, determines that certain pre-conditions have been met. For example, the engine 118 must be in traditional troll mode, the throttle must be at 100%, and the like. If not all pre-conditions are met, control returns to the second control block 204 to notify the operator via the operator interface 102.

If, however, all pre-conditions have been met, control proceeds to a sixth block 212, in which the full engage calibration process begins, and continues through a seventh block 214, in which the calibration is being performed as the operator waits.

During the calibration process of the sixth and seventh blocks, the calibration module 106 receives from the operator interface 102 a desired operating parameter associated with the engagement parameter. For example, the operator may input a desired value of pressure for a full engagement condition. Alternatively, the operator may input some other desired operating parameter, such as a parameter indicative of an output speed of the transmission 116. The calibration module 106 may then calibrate a control signal for the trolling valve 112 to achieve the engagement parameter based on the desired operating parameter. The control signal may be calibrated by any of several means. For example, the current or voltage level of the control signal may be varied, the duration of pulses of a, for example, pulse width modulated signal may be adjusted, and the like.

In an eighth block 216, it is determined if the calibration process is successfully completed. If no, a message is generated in a ninth block 218 that the full engagement calibration has failed and sent to the operator via the operator interface 102. If yes, a message is generated in a tenth block 220 that the calibration is completed, and a prompt is sent to the operator, in an eleventh block 222, to continue the process.

If the operator chooses to continue the process, the engine must be placed in the traditional troll mode, if not already, as indicated in a twelfth block 224. Then, in a thirteenth block 226, the operator must move the throttle to idle and input the command to start calibration. Moving the throttle to idle is essentially selecting a zero engagement, i.e., full slip, parameter.

In a fourteenth block 228, the full slip calibration process is begun, except that the pre-conditions must have been met, as depicted in a fifteenth block 230. Once difference in the pre-conditions, however, is that the throttle must be at idle rather than full throttle. If the pre-conditions are not met, control returns to the twelfth block 224 to notify the operator. Otherwise, control proceeds to a sixteenth block 232 and a seventeenth block 234, in which the calibration is performed, as described above.

In an eighteenth block 236, it is determined if the calibration was successful. If no, a message is generated in a nineteenth block 238 that the full slip calibration has failed and control returns to the twelfth block 224 to notify the operator. If the calibration was a success, the calibration process is declared complete, as noted in a twentieth block 240, and the operator is notified.

The above example indicated that calibration is performed at two ends of the spectrum; that is, zero engagement (full slip) and full engagement (zero slip). Once these two engagement parameters are calibrated, it may be expected that control of clutch slip will follow a well behaved curve for any levels of slip in between.

Other aspects can be obtained from a study of the drawings, the disclosure, and the appended claims.

What is claimed is:

1. A method for controlling an amount of engagement of a clutch with a transmission, comprising the steps of:

selecting an engagement parameter;

determining a desired operating parameter indicative of an output speed of the transmission associated with the engagement parameter; and calibrating a control system to generate an engagement control signal to achieve the engagement parameter based on the desired operating parameter.

2. A method, as set forth in claim 1, wherein selecting an engagement parameter includes the step of selecting at least one of a full slip and a zero slip engagement parameter.

3. A method, as set forth in claim 1, wherein determining a desired operating parameter includes the step of determining a desired parameter indicative of a pressure applied to the transmission by the clutch.

4. A method, as set forth in claim 1, wherein calibrating a control system includes the step of calibrating the engagement control signal to achieve the engagement parameter in response to the control system receiving the desired operating parameter.

5. A method, as set forth in claim 4, wherein calibrating the engagement control signal includes the step of calibrating at least one of a current and a voltage of the engagement control signal.

6. A method, as set forth in claim 1, wherein the clutch and transmission are drivably connected to an engine, and further including the step of setting at least one engine operating parameter to a desired condition prior to the step of calibrating.

7. A method for calibrating a control signal for engagement of a clutch with a transmission, comprising the steps of:

selecting a parameter associated with an amount of engagement;

determining a desired value of an operating parameter indicative of an output speed of the transmission; and adjusting a control signal such that the desired operating parameter value is calibrated to the amount of engagement.

8. An apparatus for controlling an amount of engagement of a clutch with a transmission, comprising:

means for selecting an engagement parameter;

means for determining a desired operating parameter associated with the engagement parameter; and means for calibrating a control system to generate an engagement control signal to achieve the engagement parameter based on the desired operating parameter.

9. A computer-based method for calibrating a control signal for engagement of a clutch with a transmission, comprising the steps of:

receiving a command signal to initiate a calibration procedure;

checking a status of at least one operating condition;

proceeding with the calibration procedure in response to determining that the status of the at least one operating condition has been met;

adjusting the control signal to achieve a desired amount of engagement of the clutch with the transmission; and delivering a notification signal that the calibration procedure is complete.

10. A computer-based method for calibrating a control signal for a trolling valve, the trolling valve operable to control an amount of engagement of a clutch with a transmission, comprising the steps of:

receiving a command signal to initiate a command procedure;

checking a status of at least one operating condition;

determining that the status of the at least one operating condition has been met;

selecting one of a full engage and a full slip amount of engagement;

determining a value of the control signal needed to achieve the selected amount of engagement;

selecting an other of the full engage and full slip amount of engagement;

determining a value of the control signal needed to achieve the other selected amount of engagement; and delivering a notification signal that calibration is complete.

11. An apparatus for calibrating a control signal for engagement of a clutch with a transmission, comprising:

an operator interface;

a control system in communication with the operator interface and configured to calibrate the control signal to correspond to an amount of engagement of the clutch with the transmission; and a trolling valve operable to receive the calibrated control signal from the control system and responsively control the amount of engagement of the clutch with the transmission.

12. An apparatus, as set forth in claim 11, further including at least one sensor electrically connected to the control system.

13. An apparatus, as set forth in claim 12, wherein the at least one sensor includes a sensor for determining a pressure of the clutch applied to the transmission.

14. An apparatus, as set forth in claim 12, wherein the at least one sensor includes a sensor for determining an output speed of the transmission.

15. An apparatus, as set forth in claim 12, wherein the control system includes:

a calibration module for receiving signals from the operator interface and the at least one sensor and responsively calibrating the control signal; and a control signal module for generating the calibrated control signal and delivering the signal to the trolling valve.

\* \* \* \* \*

UNITED STATES PATENT AND TRADEMARK OFFICE
CERTIFICATE OF CORRECTION

PATENT NO. : 6,916,271 B2  Page 1 of 1
APPLICATION NO. : 10/635998
DATED : July 12, 2005
INVENTOR(S) : Timothy A. Booth et al.

It is certified that error appears in the above-identified patent and that said Letters Patent is hereby corrected as shown below:

Title Page, item [75]
Inventors add:

--Mark J. Hilbert, Peoria, IL (US)--

Signed and Sealed this

Second Day of January, 2007

JON W. DUDAS
*Director of the United States Patent and Trademark Office*